United States Patent [19]

Iida

[11] Patent Number: 5,059,325
[45] Date of Patent: Oct. 22, 1991

[54] TUBULAR COFFEE FILTER WITH VERTICAL FOLD LINES

[75] Inventor: Motoyori Iida, Itami, Japan
[73] Assignee: Japan I. P. Co., Ltd., Amagasasaki, Japan
[21] Appl. No.: 530,173
[22] Filed: May 29, 1990
[30] Foreign Application Priority Data
Jun. 7, 1989 [JP] Japan .............................. 1-67123[U]
[51] Int. Cl.⁵ ........................................ B01D 29/085
[52] U.S. Cl. .................................. 210/474; 210/482; 426/82
[58] Field of Search ............... 210/477, 478, 481, 482, 210/474; 426/77, 82

[56] References Cited
U.S. PATENT DOCUMENTS
4,560,475 12/1985 Kataoka .............................. 210/249
4,715,271 12/1987 Kitagawa ............................. 99/306
4,863,601 9/1989 Wittekind et al. ................. 210/474

Primary Examiner—Robert A. Dawson
Assistant Examiner—Wanda L. Millard
Attorney, Agent, or Firm—Wenderoth, Lind & Ponack

[57] ABSTRACT

A filter for hot beverages has a filter body made of bendable sheet material and having a tubular shape and having two vertical fold lines diametrically opposite each other on the tubular shape so as to be collapsible along the vertical fold lines and to define side portions extending between the fold lines, the filter body being provided with a pair of cuts or cutouts across each fold line to form a tongue portion therebetween, the filter body being openable by urging the fold lines toward each other and the tongue portions being bendable inwards to hold the filter in an open oval state, and a bag member made of filter paper and having the top edge along both sides thereof bonded to side portions of the filter body.

1 Claim, 4 Drawing Sheets

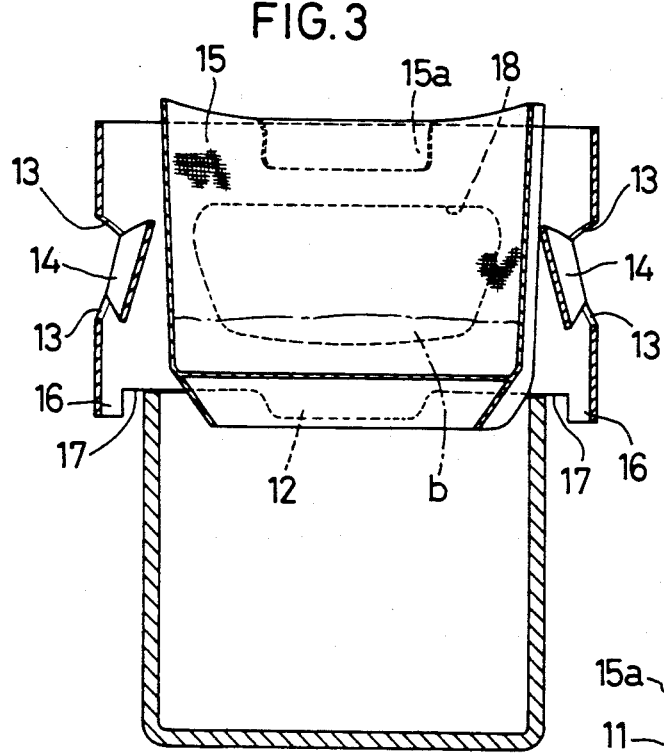
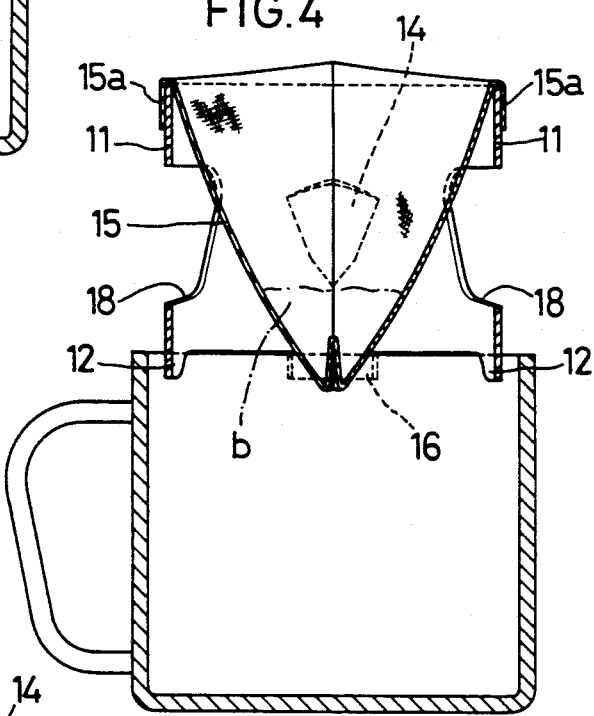
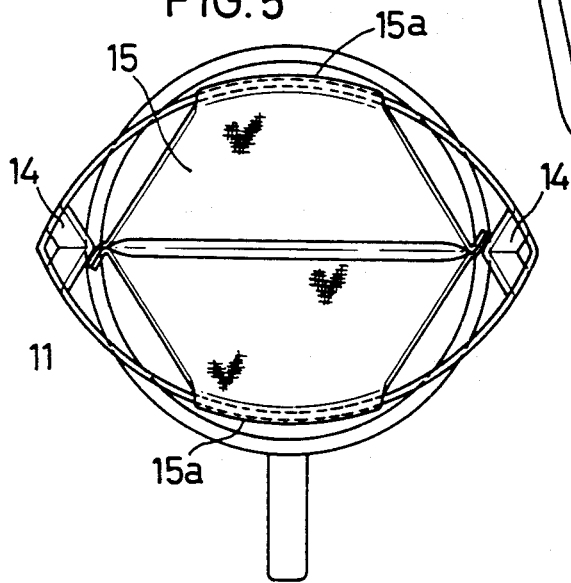

TUBULAR COFFEE FILTER WITH VERTICAL FOLD LINES

The present invention relates to a disposable filter for coffee or black tea.

There are known a variety of filters of this type. Some examples are shown in FIGS. 9 to 12. The filter shown in FIG. 9 and 10 comprises a filter body 1 having an opening 2 for receiving poured hot water and a bag member 7 made of filter paper bonded to the backside of the filter body 1 around its opening. The filter body 1 has side portions 5 adapted to be bent downwardly along fold lines 3 at both sides of the opening 2 so as to extend parallel to each other. Protrusions 6 are provided along the opposite side edges of the filter body 1. The protrusions 6 are adapted to be brought into engagement with the inner edge of a cup as shown in FIG. 9.

The filter shown in FIGS. 11 and 12 has a filter body 1 comprising three side walls 8, one of which is folded inwardly to enable the filter to be stored in its collapsed state. A bag member 7 made of filter paper is bonded to the filter body 1 by partially bonding its top edge portion to the inner surface of the two unfoldable side walls along their top edge. In use, the folded side wall is pulled outwardly to form a triangle with the three side walls as shown in FIG. 12. The filter is placed on a cup in this state.

Powdered coffee is put in the bag member of the filter placed on a cup and hot water is poured thereon. The hot water will pass through the filter paper together with the extract of coffee and drip into the cup. After use, the filter is discarded together with the coffee grounds.

The filter shown in FIGS. 9 and 10 has a problem that if the coffee cup has a shape such that it widens upwardly, the protrusions formed on both sides of the filter body cannot engage the inner wall of the cup because the side portions are urged by their own resiliency in such a direction as to disengage the protrusions from the cup.

With the filter shown in FIGS. 11 and 12, when the foldable wall is pulled outwardly from the folded position, it has a tendency to return to its folded position. Thus it is necessary to overcome such a tendency in order for the filter body to keep its triangular shape shown in FIG. 12.

Another problem with these filters is that it is structurally difficult to increase significantly the volume of the bag member as well the size of its opening as will be apparent from FIGS. 10 and 12.

Because of the small opening of the bag member, it is difficult to put powdered coffee thereinto without spilling it. Thus most of the prior art filters of this type are sold with coffee powder prepacked in the bag member. Also because of the small volume of the bag member, hot water has to be poured onto the coffee little by little with great care. In order to increase the volume of the bag member of the prior art filters, it is necessary to fold it in a complicated manner. Such a bag member is very difficult to make.

It is an object of the present invention to provide a filter which can be stably placed on a cup of any shape, which can accommodate a bag member of any shape, and which can accommodate a bag member of having a larger volume.

According to the present invention, the bag member has a larger volume and a larger opening, when it is spread open, than that of any prior art filter of this type as is apparent from FIGS. 5, 10 and 12. Thus a larger amount of hot water can be poured into the bag member without difficulty.

The filter body can be held in such a position that its top and bottom openings have an oval shape simply by pushing in tongue portions. The filter can be placed stably on any cup irrespective of the shape of its opening.

Other features and objects of the present invention will become apparent from the following description taken with reference to the accompanying drawings, in which:

FIG. 3 is a sectional elevation view of the same;

FIG. 4 is a transverse sectional view of the same;

FIG. 5 is a top plan view of the same;

FIRST EMBODIMENT

Figure 1:
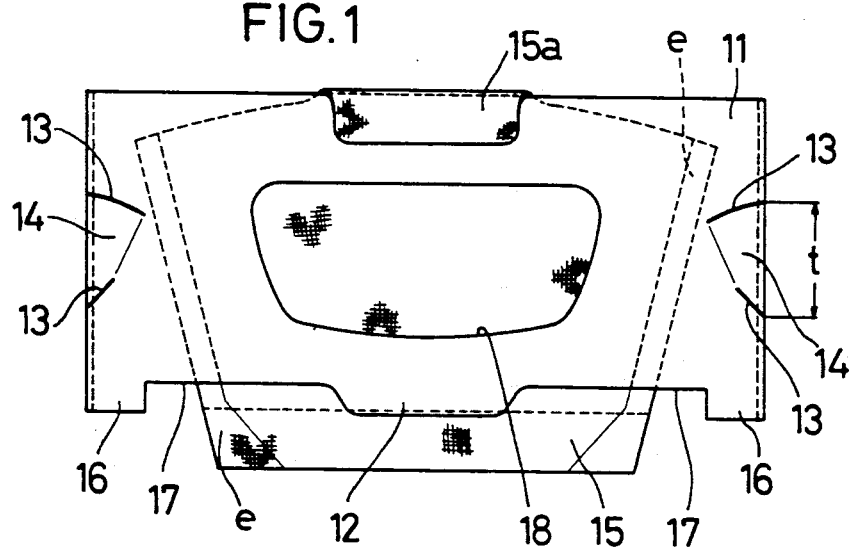
FIG. 1 is an elevation view of the first embodiment of the present invention.
Figure 2:
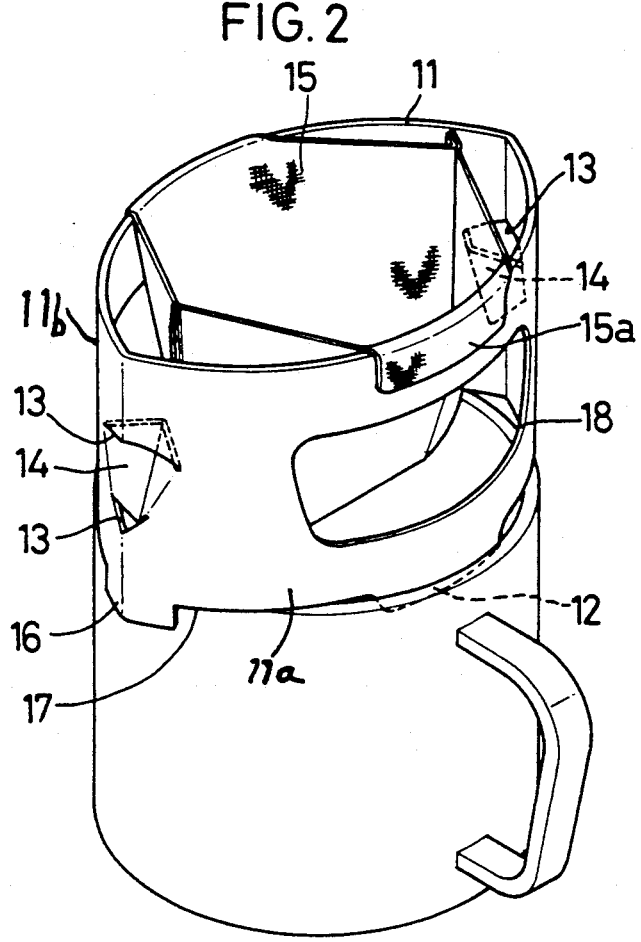
FIG. 2 is a perspective view of the same showing how it is used.

In the first embodiment shown in FIGS. 1 and 2, a filter body 11 is formed by rolling a strip of waterproofed cardboard, bonding its ends together and collapsing the thus made annular web along diametrically opposite vertical fold lines so that the bonded part will be at a position other than the position of the fold lines. It is provided in the center of each side portion 11a and 11b with a hole 18 and is provided along its bottom edge with protrusions 12 and 16 at the center and both ends of each side portion, respectively.

The filter body 11 is provided with two pairs of cuts 13, each pair extending inwardly from the respective fold lines. As shown in FIG. 2, by inwardly bending the tongue portions 14 defined between the respective pairs of cuts 13, the filter body 11 can be held in such a position that its top and bottom openings have an oval shape. The size of the top and bottom openings of the filter is determined by the distance t between the pairs of cuts 13.

A bag member 15 made of filter paper is received between the side portions of the filter body 11 and has its opposed central portions 15a along top edge thereof bonded to the opposed central portions of the side portions of the filter body 11. The portions 15a may be bonded to either the front or back surface of the side portion of the filter body 11. Their top edge should preferably be at the same level as the top edge of the filter body 11.

In use, pressure is applied to both ends of the filter body 11 in the collapsed state to spread the side portions open so that its top and bottom openings will have an oval shape. The tongue portions 14 are pushed in to hold the filter in this state. As the filter body is spread open, the bag member 15, having its opposed central portions 15a bonded to the opposed upper central portions of the said portions of the filter body 11, will spread open into an inverted truncated cone as shown in FIG. 4.

As shown in FIGS. 2 to 4, the filter thus opened is placed on a cup so that the bag member 15 will be located substantially in the center of the opening of the cup and the protrusions 12 are inside the cup. A powdery material b such as roasted coffee or black tea is put in the bag member 15 and a desired amount of hot water is poured thereon. The extract of the powdery material b will pass through the bag member 15 together with the hot water and drip into the cup.

SECOND EMBODIMENT

Figure 6:
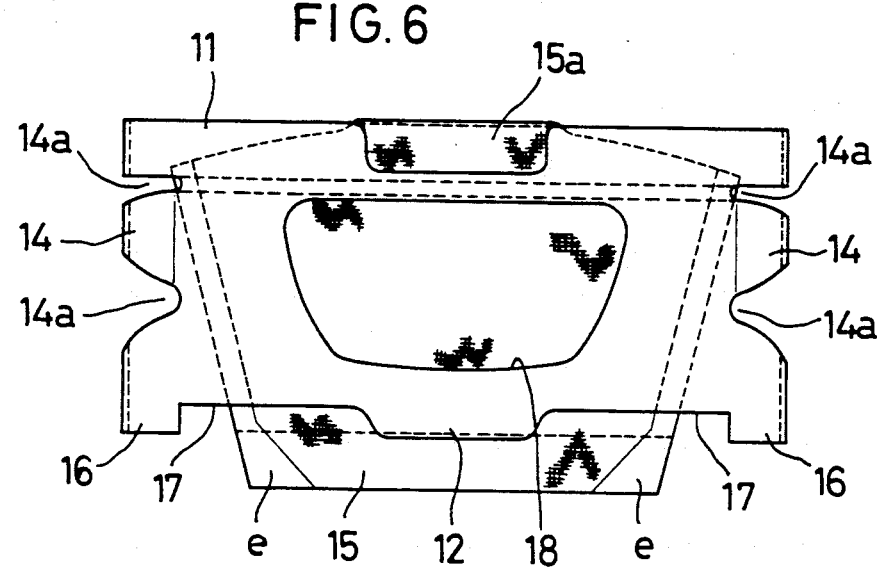
FIG. 6 is an elevation view of the second embodiment.
Figure 7:
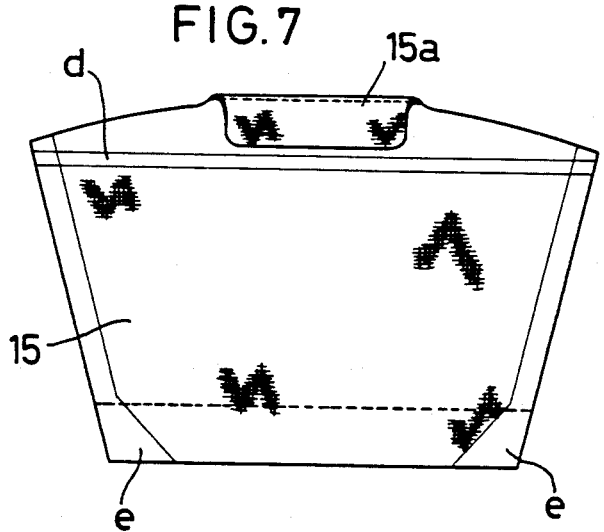
FIG. 7 is an elevation view of the bag member of the same.
Figure 8A:
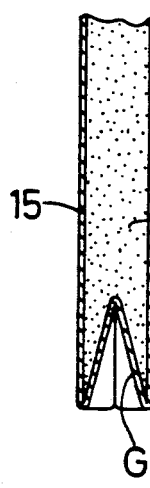
FIG. 8A is a transverse sectional view of the same in its closed position.
Figure 8B:
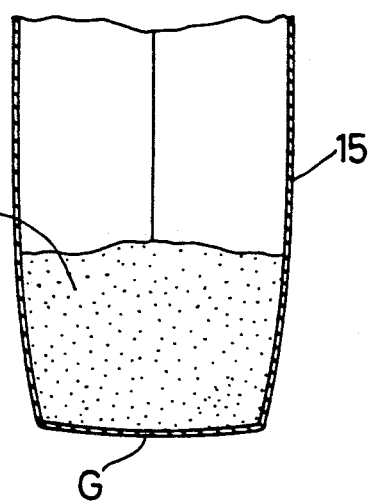
FIG. 8B is a transverse sectional view of the same in its opened position.
Figure 9:
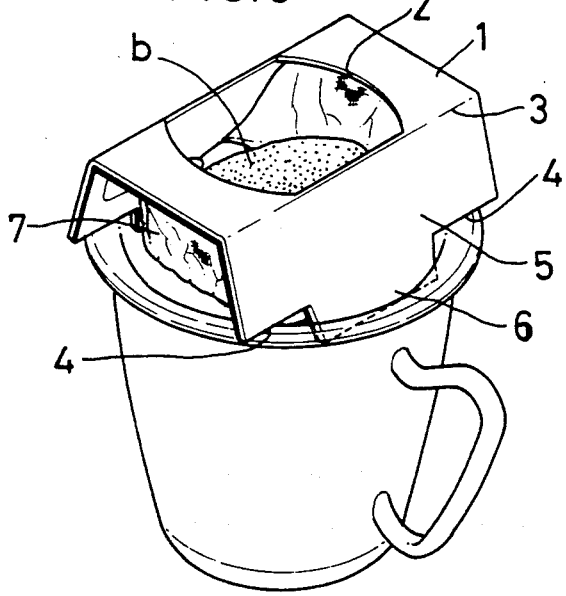
FIG. 9 is a perspective view of a prior art filter in use.
Figure 10:
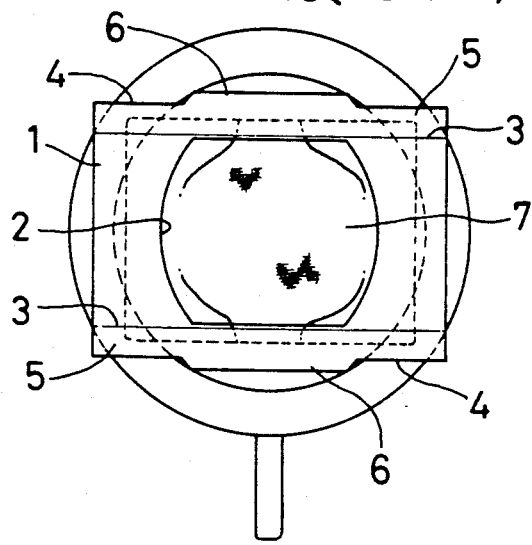
FIG. 10 is a top plan view of the same.
Figure 11:
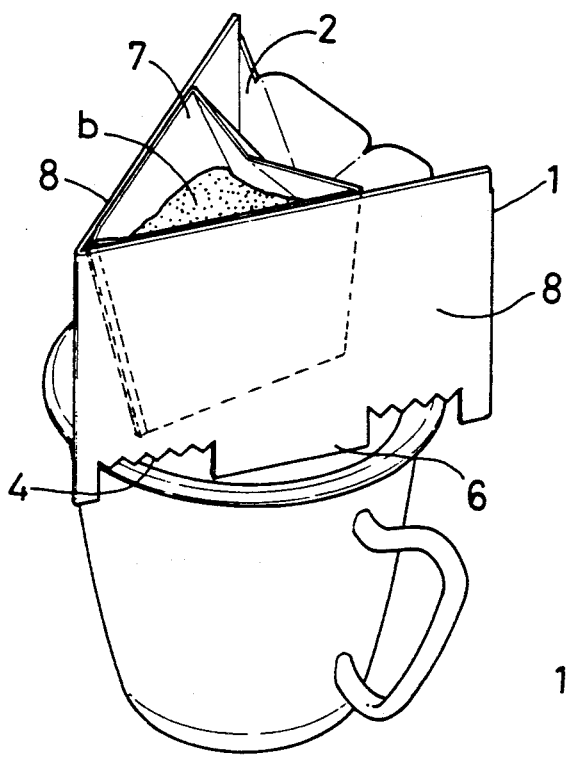
FIG. 11 is a perspective view of another prior art filter in use.
Figure 12:
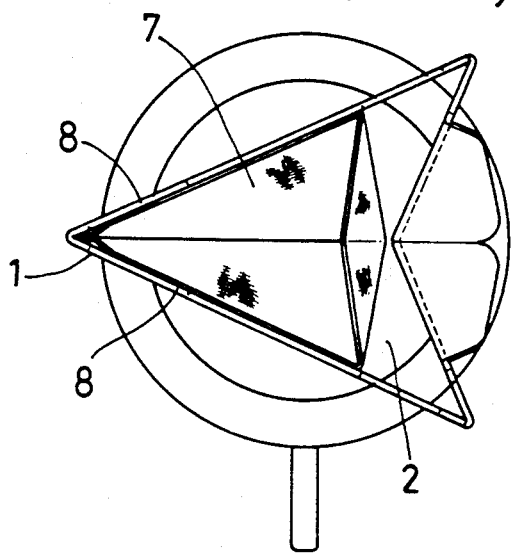
FIG. 12 is a top plan view of the same.

In this embodiment, as shown in FIG. 6, the filter body 11 is provided across each fold line with upper and lower cutouts 14a so as to define a tongue portion 14 therebetween. The bag member 15 is filled with a predetermined amount of powdery material b beforehand and has its opening heat-sealed weakly as shown at d in FIG. 7 so as to be opened easily by pulling its both sides apart. Further, the bag member 15 has its bottom gussetted as shown at G in FIG. 8A. By pouring hot water into the bag member 15 through its opening, its bottom area will spread as shown in FIG. 8B. The letters e indicate strong seals.

The filter of the second embodiment is placed on a cup with the filter body spread open in the same manner as the first embodiment.

The filter can be easily located concentrically with the opening of a cup by placing it so that the edge of the cup will be received in recesses 17 formed between the protrusions 12 and 16.

The provision of the holes 18 will make it possible to visually check the level of water in the bag member 15.

As the amount of water in the bag member 15 increases, its bottom area spreads as shown in FIG. 8B. This serves to increase the rate of extraction and to lower the center of gravity of the bag member. Thus the filter can be supported more stably on a cup.

What is claimed is:

1. A filter for hot beverage comprising: a filter body made of bendable sheet material and having a tubular shape and having two vertical fold lines diametrically opposite each other on said tubular shape so as to be collapsible along said vertical fold lines and to define side portions extending between said fold lines, said filter body being provided with a pair of cuts or cutouts across each fold line to form a tongue portion therebetween, said filter body being openable by urging said fold lines toward each other and said tongue portions being bendable inwards to hold the filter in an open oval state, and a bag member made of filter paper and having the top edge along both sides thereof bonded to side portions of said filter body.

* * * * *